United States Patent
Takahashi

(10) Patent No.: US 9,221,638 B1
(45) Date of Patent: Dec. 29, 2015

(54) IMAGE FORMING APPARATUS

(71) Applicants: KABUSHIKI KAISHA TOSHIBA, Minato-ku, Tokyo (JP); TOSHIBA TEC KABUSHIKI KAISHA, Shinagawa-ku, Tokyo (JP)

(72) Inventor: Kazutoshi Takahashi, Mishima (JP)

(73) Assignees: Kabushiki Kaisha Toshiba, Tokyo (JP); Toshiba Tec Kabushiki Kaisha, Tokyo (JP)

( * ) Notice: Subject to any disclaimer, the term of this patent is extended or adjusted under 35 U.S.C. 154(b) by 0 days.

(21) Appl. No.: 14/303,692

(22) Filed: Jun. 13, 2014

(51) Int. Cl.
| | |
|---|---|
| B65H 7/02 | (2006.01) |
| B65H 9/20 | (2006.01) |
| B65H 7/20 | (2006.01) |
| F16F 1/04 | (2006.01) |
| F16F 1/06 | (2006.01) |
| B65H 7/14 | (2006.01) |

(52) U.S. Cl.
CPC .. *B65H 9/20* (2013.01); *B65H 7/02* (2013.01); *B65H 7/14* (2013.01); *B65H 7/20* (2013.01); *F16F 1/047* (2013.01); *F16F 1/06* (2013.01); *B65H 2553/612* (2013.01)

(58) Field of Classification Search
CPC ....... B65H 7/14; B65H 7/02; B65H 2553/612
See application file for complete search history.

(56) References Cited

U.S. PATENT DOCUMENTS 7,967,288 B2   6/2011  Nishinakama

FOREIGN PATENT DOCUMENTS

JP         2010276155 A  * 12/2010

* cited by examiner

*Primary Examiner* — Luis A Gonzalez
(74) *Attorney, Agent, or Firm* — Amin, Turocy & Watson, LLP

(57) ABSTRACT

An image forming apparatus comprises a paper detection mechanism configured to detect papers passing through a conveyance path. The paper detection mechanism includes a rotation shaft which extends in a direction orthogonal to a conveyance direction of the paper; a lever integrally arranged on the rotation shaft; a torsion coil spring which is arranged around the outer periphery of the rotation shaft to energize the front end of the lever so that the lever protrudes to the conveyance path; and a sensor which detects the conveyance of paper when the lever pressed by the paper pivots. The torsion coil spring integrally includes a main coil part which is composed of a plurality of turns of coil and has a preset diameter, and a large diameter coil part which is larger in diameter than the main coil part and less in the number of turns than the main body coil part.

14 Claims, 9 Drawing Sheets

FIG.7A
FIG.7B
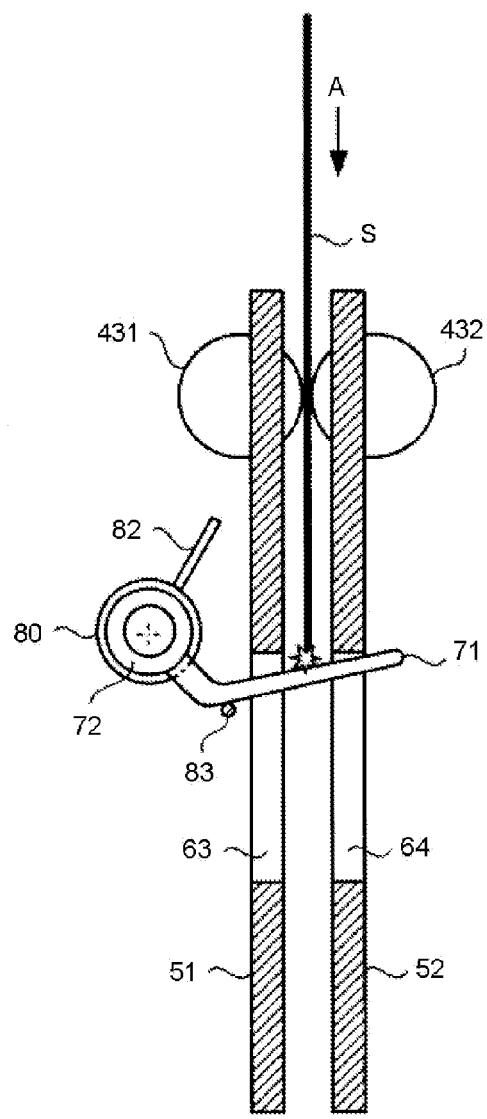
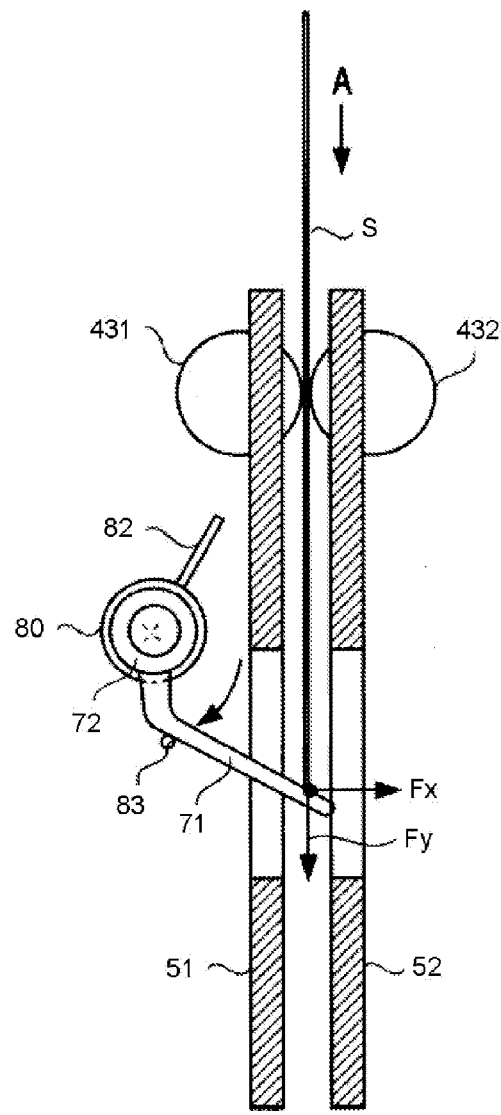

FIG.10A
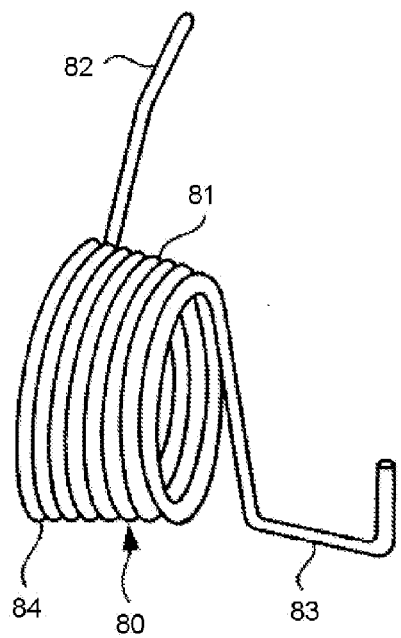
FIG.10B
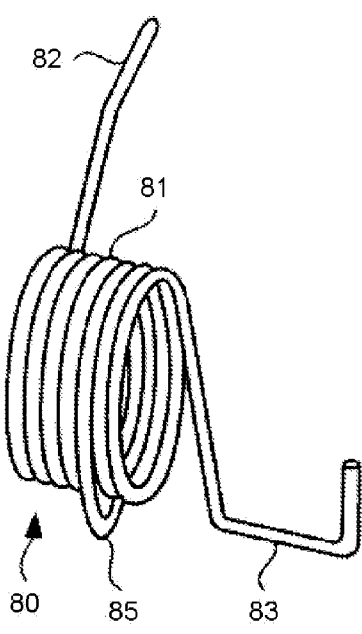
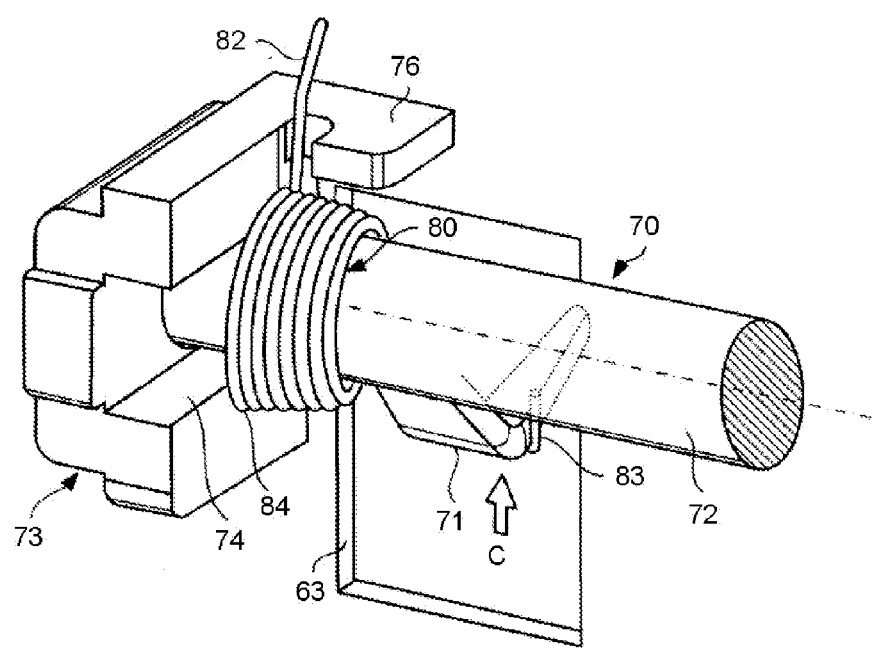

IMAGE FORMING APPARATUS

FIELD

Embodiments described herein relate to an image forming apparatus provided with a paper detection mechanism and a torsion coil spring.

BACKGROUND

Conventionally, in an image forming apparatus such as a MFP (Multi Function Peripheral), a plurality of cassettes are arranged to store paper, and the paper taken out of the cassette is conveyed to an image forming section through a conveyance path to be formed with an image. Further, the paper formed with an image is discharged through the conveyance path. A paper detection mechanism is arranged on the conveyance path to detect the conveyance of paper.

The paper detection mechanism comprises a lever for detecting the paper and an actuator for driving the lever, wherein the actuator includes a torsion coil spring for energizing the lever towards the conveyance path. If the paper is conveyed on the conveyance path, the lever is pressed by the paper and pivots against the energizing force of the torsion coil spring. Then the conveyance of the paper can be detected by determining the pivoting of the lever.

By the way, in the paper detection mechanism which uses the torsion coil spring, large load is applied to the paper when the paper collides with the lever. Especially, when thin paper or soft paper is conveyed, there is a drawback that the front end of the paper deforms due to the load when colliding with the lever and paper jam occurs. Further, though the torsion coil spring is arranged nearby the bearing part of the rotation shaft constituting the actuator, the torsion coil spring may slant due to the repulsive force of the spring. If the torsion coil spring slants, part of the spring enters the bearing part, which may lead to a failure that the actuator cannot operate normally.

BRIEF DESCRIPTION OF THE DRAWINGS

FIG. 7A and FIG. 7B are illustration diagrams illustrating the operations of the paper detection mechanism;

FIG. 10A and FIG. 10B are perspective views illustrating a torsion coil spring according to a second embodiment;

FIG. 11 is a perspective view illustrating a case in which the torsion coil spring shown in FIG. 10A is used in the paper detection mechanism.

DETAILED DESCRIPTION

Figure 1:
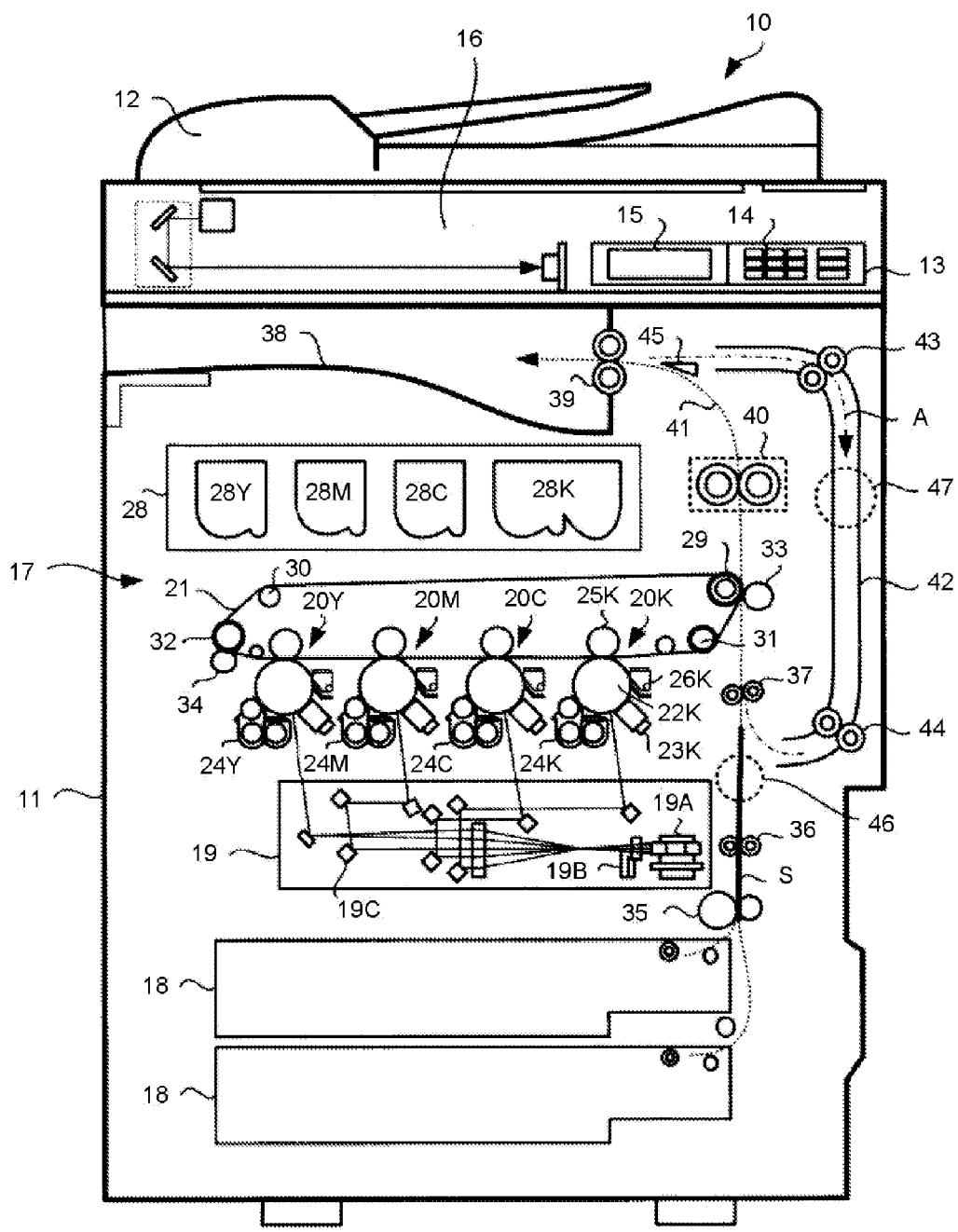
FIG. 1 is a diagram illustrating the constitution of an image forming apparatus according to one embodiment.

In accordance with one embodiment, an image forming apparatus comprises a paper conveyance section configured to guide paper along a conveyance path and a paper detection mechanism configured to detect the paper passing through the conveyance path; wherein the paper detection mechanism includes a rotation shaft configured to extend in a direction orthogonal to a conveyance direction of the paper passing through the conveyance path; a lever integrally configured on the rotation shaft; a bearing configured to support the rotation shaft; a torsion coil spring, which is arranged around the outer periphery of the rotation shaft to energize the front end of the lever so that the lever protrudes to the conveyance path, configured to integrally include a main coil part which is composed of a plurality of turns of coil and has a preset diameter, and a large diameter coil part which is larger in diameter than the main coil part and less in the number of turns than the main body coil part; and a sensor configured to detect the conveyance of paper when the lever pressed by the paper passing through the conveyance path pivots.

Hereinafter, the image forming apparatus and the torsion coil spring according to the embodiment are described in detail with reference to the accompanying drawings. In addition, the same component in each drawing is endowed with the same reference numeral.

A First Embodiment

FIG. 1 is a diagram illustrating the constitution of the image forming apparatus according to one embodiment. In FIG. 1, an image forming apparatus 10 is, for example, a printer, a copier, a MFP (Multi-Function Peripherals) serving as a compound machine, and the like. In the following description, the MFP is described as one example. At the upper portion of a main body 11 of a MFP 10 is arranged a document table above which an ADF (Automatic Document Feeder) 12 is arranged in an openable and closable manner. Further, an operation panel 13 is arranged at the upper portion of the main body 11. The operation panel 13 includes various operation keys 14 and a touch panel type display section 15.

A scanner section 16, which is arranged under the ADF 12 inside the main body 11, reads the document fed by the ADF 12 or the document placed on the document table to generate image data. A printer section 17 is arranged at the center part of the main body 11, and a plurality of cassettes 18 are arranged at the lower part of the main body 11 to store paper of various sizes. The printer section 17 consisting of a photoconductive drum, a laser and the like processes the image data read by the scanner section 16 and the image data created by, for example, a PC (Personal Computer), and fixes an image on paper serving as a recording medium. The paper on which an image is fixed by the printer section 17 is discharged to a paper discharge section 38.

The printer section 17, which is, for example, a tandem-form color laser printer, scans the photoconductor with the laser beam from a laser exposure device 19 to generate an image. The printer section 17 includes yellow (Y), magenta (M), cyan (C) and black (K) image forming sections 20Y, 20M, 20C and 20K. The image forming sections 20Y, 20M, 20C and 20K are arranged in parallel under an intermediate transfer belt 21 along a direction from the upstream side to the downstream side.

As the image forming sections 20Y, 20M, 20C and 20K are structurally identical to each other, the image forming section 20K is described as a representative example. The image forming section 20K is provided with a photoconductive drum 22K around which an electrostatic charger 23K, a developing device 24K, a transfer roller 25K, a cleaner 26K and the like are arranged. A toner cartridge 28 is arranged above the image forming sections 20Y, 20M, 20C and 20K to supply toner for the developing devices 24Y, 24M, 24C and 24K. The toner cartridge 28 consists of yellow (Y), magenta (M), cyan (C) and black (K) toner cartridges 28Y, 28M, 28C and 28K which are adjacent to each other.

From a viewpoint of heat resistance and abrasion resistance, for example, a semi-conductive polyimide is used as the intermediate transfer belt 21 which moves cyclically. The intermediate transfer belt 21 is stretched by a drive roller 29 and driven rollers 30, 31 and 32. The intermediate transfer belt 21 faces to the photoconductive drum 22K and can be contacted with the photoconductive drum 22K. At the position where the intermediate transfer belt 21 faces to the photoconductive drum 22K, a primary transfer voltage is applied by the transfer roller 25K to primarily transfer a toner image on the photoconductive drum 22K to the intermediate transfer belt 21.

Further, a secondary transfer roller 33 is arranged opposite to the drive roller 29. When paper S passes through the space between the drive roller 29 and the secondary transfer roller 33, a secondary transfer voltage is applied by the secondary transfer roller 33 to secondarily transfer the toner image on the intermediate transfer belt 21 to the paper S. A belt cleaner 34 is arranged nearby the driven roller 32 of the intermediate transfer belt 21.

A black laser beam is emitted from the laser exposure device 19 to the exposure position of the photoconductive drum 22K to form a latent image on the photoconductive drum 22K. The electrostatic charger 23K uniformly charges the entire surface of the photoconductive drum 22K. The developing device 24K supplies two-component developing agent including toner and carrier for the photoconductive drum 22K using a developing roller to form a toner image on the photoconductive drum 22K. After the toner image on the photoconductive drum 22K is primarily transferred to the intermediate transfer belt 21, the cleaner 26K removes the toner left on the surface of the photoconductive drum 22K.

The laser exposure device 19, which scans the laser beam emitted from the semiconductor laser device in an axis direction of the photoconductive drum 22K, consists of a polygon mirror 19A, an image forming lens system 19B, a mirror 19C and the like.

Further, a separation roller 35 for taking out the paper S in the paper feed cassette 18, a conveyance roller 36 and a register roller 37 are arranged along the conveyance path from the paper feed cassette 18 to the secondary transfer roller 33, and a fixing device 40 is arranged at the downstream side of the secondary transfer roller 33. A paper discharge roller 39 for discharging the paper S to the paper discharge section 38 is arranged at the downstream side of the fixing device 40. The paper S is conveyed through a first conveyance path from the conveyance roller 36 via the register roller 37 to the secondary transfer roller 33, and a second conveyance path from the secondary transfer roller 33 to the paper discharge roller 39 (the first conveyance path and the second conveyance path are represented by a reference numeral 41).

The conveyance roller 36, the register roller 37 and the paper discharge roller 39 constitute a paper conveyance section which conveys the paper S to the printer section 17 and conveys the paper on which an image is formed by the printer section 17 to the paper discharge section 38.

Further, a third conveyance path (reversal conveyance path 42) is arranged to be used when carrying out duplex printing. The reversal conveyance path 42 is provided with a plurality of conveyance rollers 43 and 44. The paper S is temporarily conveyed from the paper discharge roller 39 towards the paper discharge section 38, and then is switched back and conveyed to the reversal conveyance path 42. On the reversal conveyance path 42, the paper S is guided towards the direction of the secondary transfer roller 33 (a direction indicated by an arrow A) through the rotation of the conveyance rollers 43 and 44. That is, the paper S passing through the fixing device 40 is guided to the paper discharge section 38 or the reversal conveyance path 42 by a distribution gate 45.

The operations of the image forming apparatus 10 are briefly described. If image information is input from the scanner section 16 or a personal computer terminal (PC) and the like, yellow (Y), magenta (M), cyan (C) and black (K) toner images are formed by each of the image forming sections 20Y~20K. The magenta (M), cyan (C) and black (K) toner images are multiple-transferred at the same position where the yellow (Y) toner image is formed on the intermediate transfer belt 21 to obtain full color toner image.

The full color toner image on the intermediate transfer belt 21 is secondarily transferred to the paper S by the secondary transfer roller 33. The paper S is fed from the paper feed cassette 18 to the position of the secondary transfer roller 33. The paper S to which the toner image is secondarily transferred is conveyed to the fixing device 40 to fix the toner image on the paper S. On the other hand, after the secondary transfer is completed, the toner left on the intermediate transfer belt 21 is cleaned by the belt cleaner 34.

Next, a paper detection mechanism according to the embodiment is described. The paper detection mechanism is used to detect the paper conveyed by the conveyance path 41 or the reversal conveyance path 42 of the paper S. For example, the paper detection mechanism is arranged at the position indicated by dotted circles 46 and 47 shown in FIG. 1.

Figure 2:
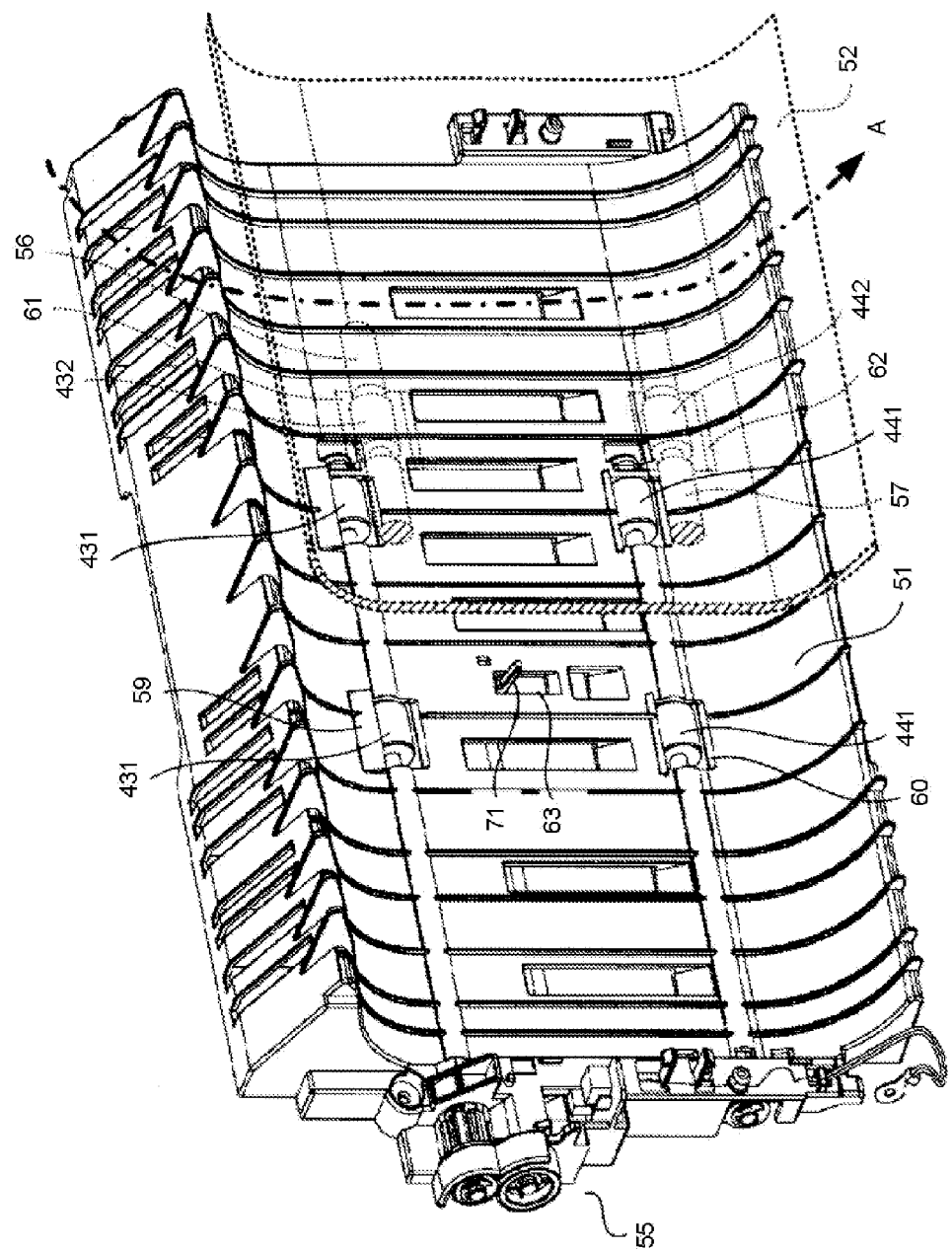
FIG. 2 is a perspective view illustrating a paper detection mechanism according to the embodiment.
Figure 3:
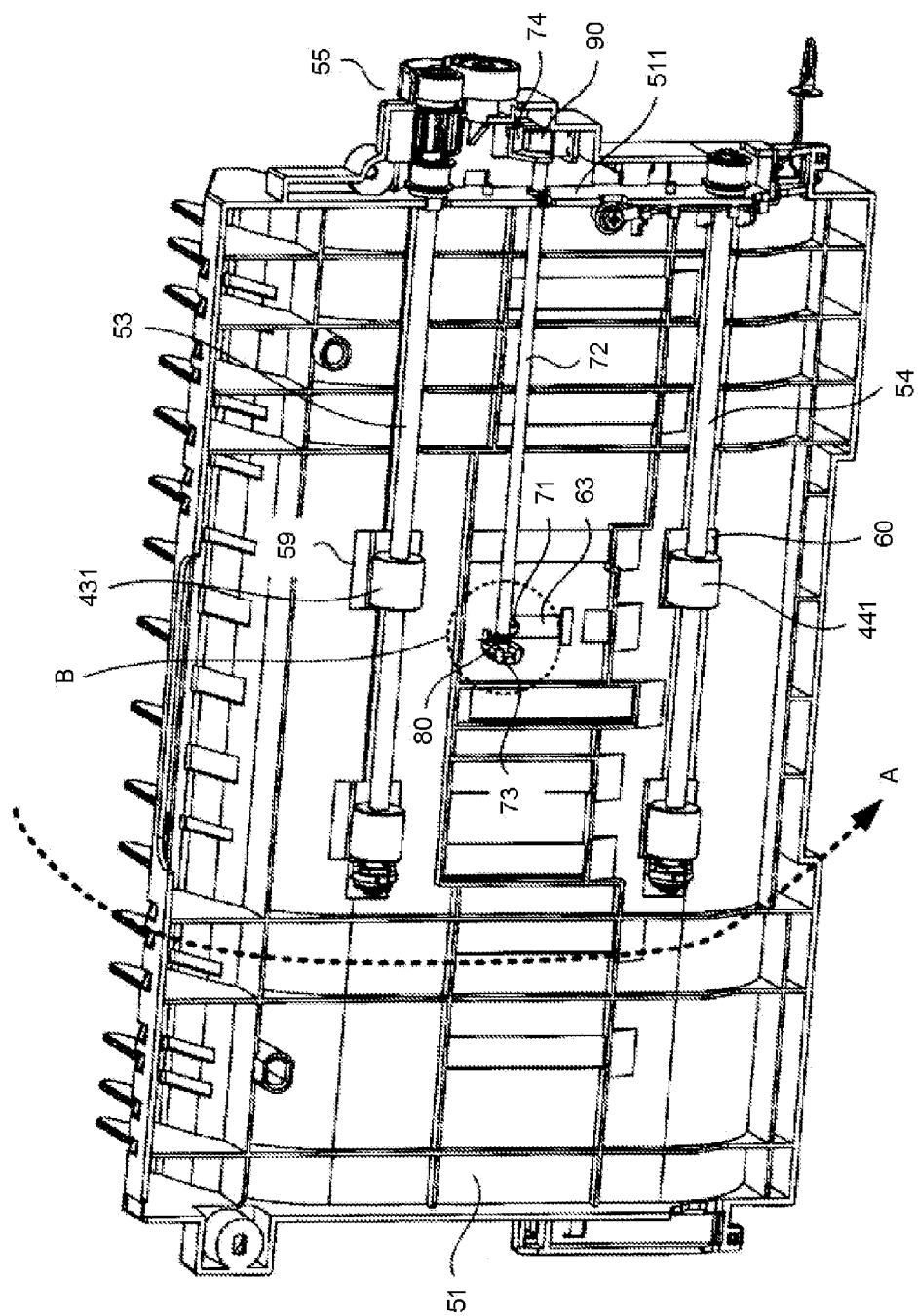
FIG. 3 is a perspective view illustrating the paper detection mechanism viewed from the back side of FIG. 2.

FIG. 2 is a perspective view illustrating the paper detection mechanism arranged on the reversal conveyance path 42. FIG. 3 is a perspective view illustrating the paper detection mechanism viewed from the back side of a guide plate 51 shown in FIG. 2.

In FIG. 2, the guide plate 51 is arranged opposite to a guide plate 52 across the reversal conveyance path 42, and the paper is clamped between the guide plate 51 and the guide plate 52 and guided in the direction indicated by the arrow A. For the sake of convenience, the guide plate 52 is simplified and only part of the guide plate 52 is shown by dotted lines in FIG. 2.

Rotation shafts 53 and 54 (FIG. 3) are arranged in the guide plate 51 to support conveyance rollers 431 and 441, respectively, and the rotation shafts 53 and 54 are rotated by a rotation mechanism 55. Further, rotation shafts 56 and 57 are arranged in the guide plate 52 to support a conveyance roller 432 and a conveyance roller 442, respectively.

Windows 59 and 60 are formed at the positions facing to the conveyance rollers 431 and 441 of the guide plate 51, and windows 61 and 62 are formed at the positions facing to the conveyance rollers 432 and 442 of the guide plate 52. Thus, the conveyance roller 431 is contacted with the conveyance roller 432, and the conveyance roller 441 is contacted with the conveyance roller 442. The conveyance rollers 432 and 442 are driven rollers which are rotated by the rotation of the conveyance rollers 431 and 441. Further, at the approximate center portion of the guide plate 51 is formed a window 63 through which a lever 71 protrudes. In addition, a window 64 (FIG. 7A) is formed in the guide plate 52 at the position facing to the window 63 of the guide plate 51.

In FIG. 3, the base end of the lever 71 is integrally fixed on a rotation shaft 72, and the front end of the lever 71 protrudes from the window 63 to the paper conveyance path. One end of the rotation shaft 72 is supported by a bearing 73 and the other end is supported by a supporting section 511 of the guide plate 51. If the lever 71 contacted with the paper rotates, the rotation shaft 72 rotates. A sensor 90 is arranged at the front end of the rotation shaft 72 at the side of the supporting section 511 to detect the rotation of the rotation shaft 72. The sensor 90 is described with reference to FIG. 6. As the lever 71 is at the position of the window 63 which is formed at the approximate center portion of the guide plate 51, the conveyance of the paper can be detected at the center portion of the paper conveyance path.

Figure 4:
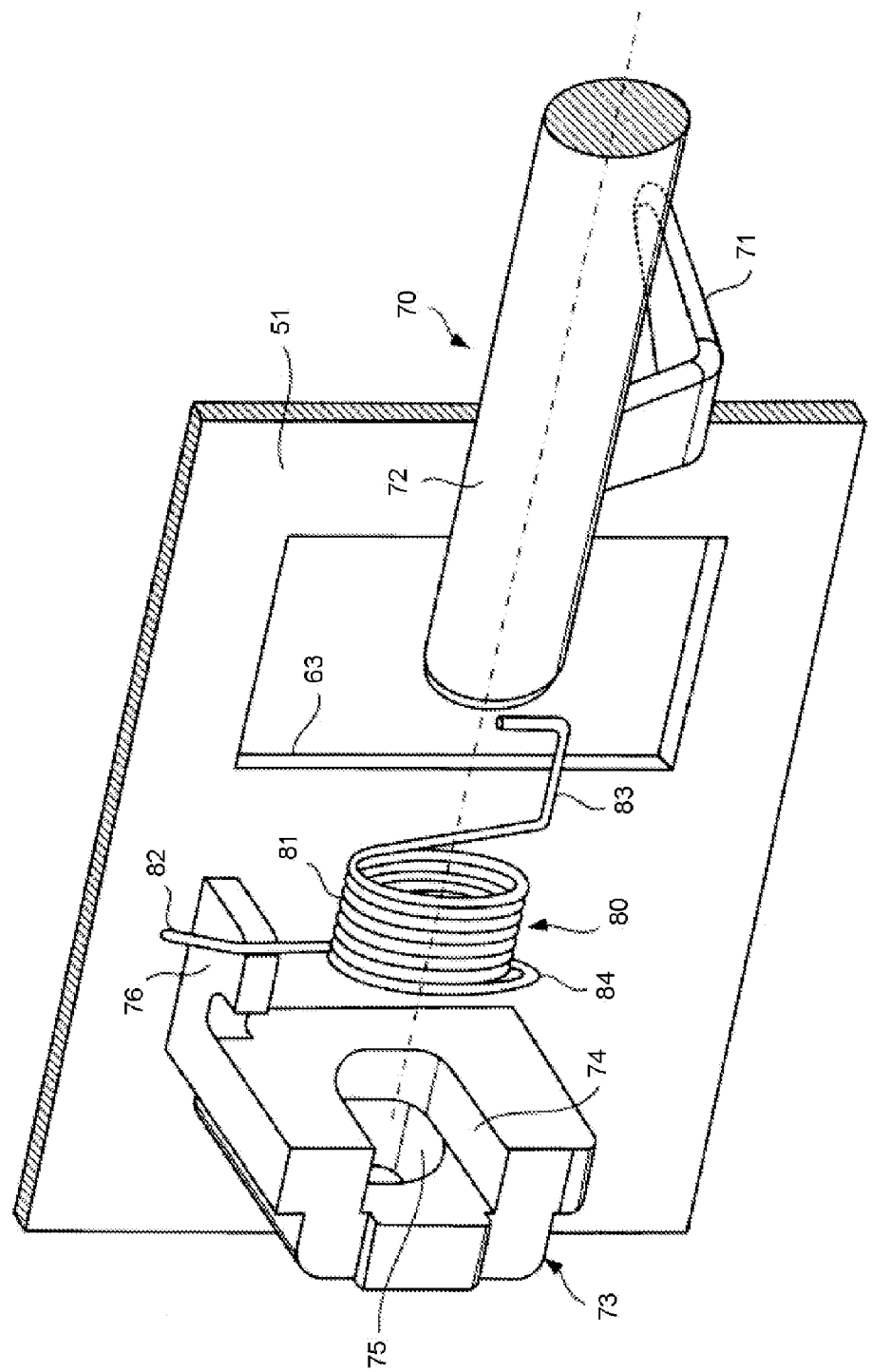
FIG. 4 is an enlarged exploded perspective view illustrating the main portions of the paper detection mechanism according to the embodiment.
Figure 6:
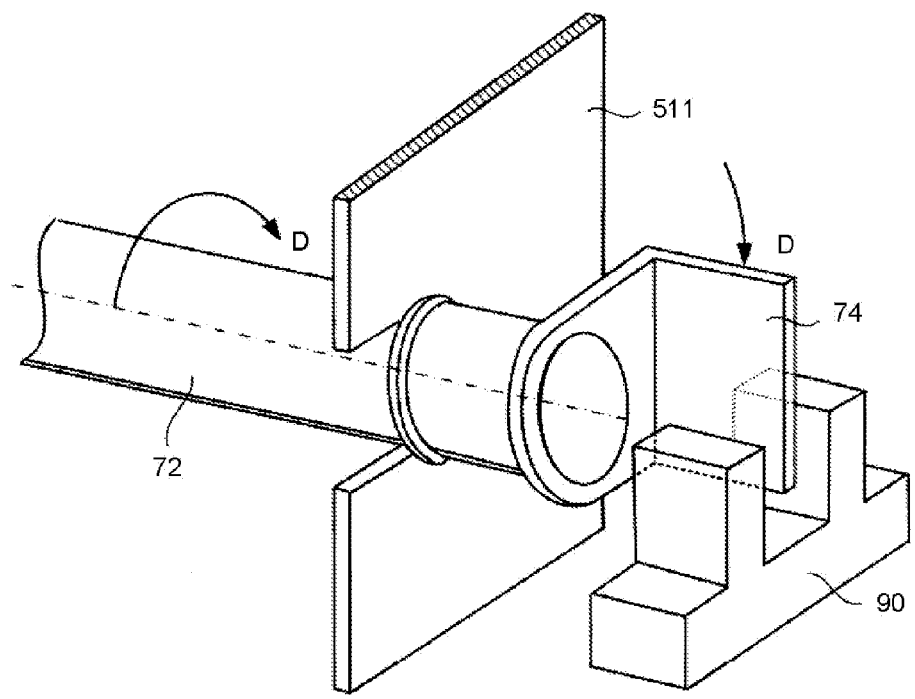
FIG. 6 is a perspective view illustrating a sensor for detecting the conveyance of paper according to the embodiment.

FIG. 4 is an enlarged exploded perspective view illustrating the main portions of the paper detection mechanism, that is, the part of a circle B shown in FIG. 3. In FIG. 4, the paper detection mechanism consists of an actuator 70 and a torsion coil spring 80. The actuator 70 includes the lever 71, the rotation shaft 72 on which the lever 71 is arranged, the bearing 73 and a photo interrupter 74 (FIG. 6)

The bearing 73, which is, for example, a resin member, is provided with a supporting section 74 for supporting one end of the rotation shaft 72. As to the structure of mold of the supporting section 74, two U-shaped parts are alternately combined, and one end of the rotation shaft 72 is inserted into a cylindrical part 75 which is formed by two semicircles. Further, a hook 76 is arranged on the bearing 73.

The torsion coil spring 80 includes a main coil part 81 which is composed of a plurality of turns of metal coil and has a preset diameter, a first arm 82 which extends from one end of the main coil part 81, and an L-shaped second arm 83 which extends from the other end of the main coil part 81 and supports the lever 71. The torsion coil spring 80 is formed in such a manner that the diameter of part of the coil of the main coil part 81 is larger. In the example shown in FIG. 4, in the main coil part 81, a coil 84 connected with the first arm 82 is greater in diameter. Hereinafter, the coil having larger diameter is referred to as a large diameter coil 84. Though the main coil part 81 is composed of a plurality of turns of coil, the number of turns of the large diameter coil 84 (e.g. one turn) is smaller than the number of turns of the main coil part 81.

Figure 5:
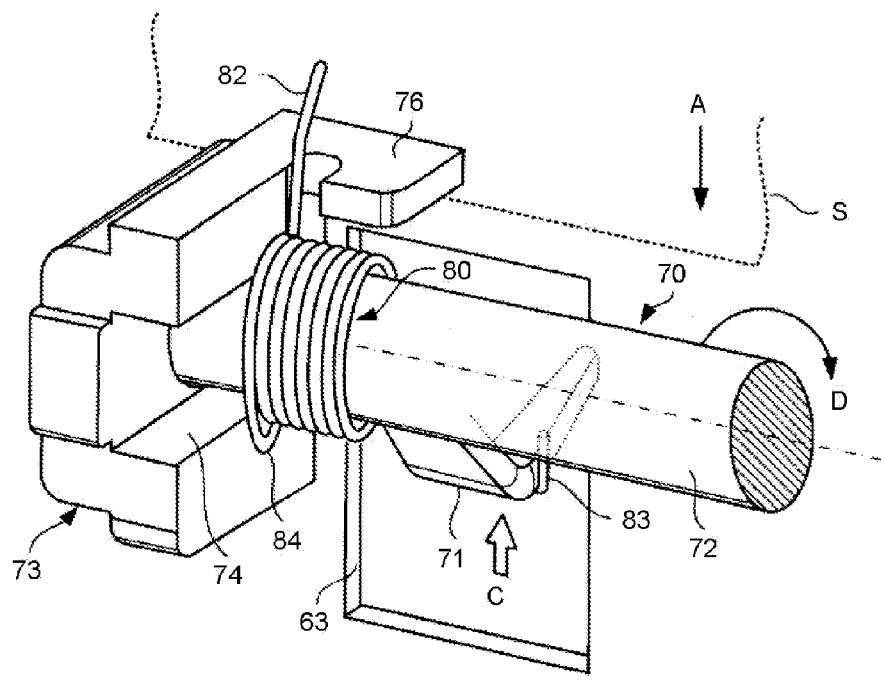
FIG. 5 is a perspective view illustrating a state in which the paper detection mechanism is assembled.

FIG. 5 is a perspective view illustrating a state in which the paper detection mechanism is assembled.

As shown in FIG. 5, the main body of the bearing 73 is fixed nearby the window 63 of the guide plate 51. One end of the rotation shaft 72 is inserted into the cylindrical part 75 of the bearing 73. The torsion coil spring 80 is arranged in such a manner that the main coil part 81 is wound around the outer periphery of the rotation shaft 72.

Further, in the torsion coil spring 80, the first arm 82 is hooked by the hook 76 of the bearing 73, the large diameter coil 84 is contacted with the end surface (entrance part) of the supporting section 74 of the bearing, and the second arm 83 supports the bottom of the lever 71.

As the torsion coil spring 80 applies a force in the direction in which the coil is wound, the second arm 83 energizes the lever 71 in a direction indicated by an arrow C. Thus, the lever 71 protrudes from the window 63 of the guide plate 51. If the front end of the conveyed paper S contacts with the lever 71 and presses the lever 71 in a direction opposite to the direction indicated by the arrow C, the torsion coil spring 80 receives a torsion moment in the direction in which the coil is unwound around the central axis of the main coil part 81. Then if the lever 71 rotates in the direction indicated by an arrow D against the spring force, the rotation shaft 72 rotates as well, thus, the photo interrupter 74 is rotated.

FIG. 6 is a perspective view illustrating the sensor 90 for detecting the conveyance of the paper. The other end of the rotation shaft 72 is supported by the supporting section 511 of the guide plate 51, and the photo interrupter 74 is arranged at the front end of the rotation shaft 72. If the paper contacts with the lever 71 and therefore rotation shaft 72 rotates in the direction indicated by an arrow D, the photo interrupter 74 is rotated and enters into the sensor 90.

The sensor 90 is, for example, a photoelectric sensor including a light projection section and a light receiving section. Generally, though light is emitted from the light projection section to the light receiving section, the light emitted from the light projection section towards the light receiving section is shielded if the rotation shaft 72 rotates and the photo interrupter 74 enters into the sensor 90. Thus, the conveyance of the paper can be detected by determining that the light is shielded.

According to the detection result of the sensor 90, if the paper S is being conveyed normally, the paper conveyance section conveys the paper S in sequence. Further, if paper jam occurs in the conveyance path and the conveyance of paper is not detected, the paper conveyance section stops the conveyance of the paper.

As the diameter of the main coil part 81 is smaller than that of the large diameter coil 84, the torsion coil spring 80 has two types of spring properties with the small diameter coil and the large diameter coil 84. The main coil part 81 supplies steady torque and the large diameter coil 84 is low in rigidity when compared with the coil of the main coil part 81. Thus, in a case of detecting the paper using the torsion coil spring 80, when the paper collides with the lever 71 of the actuator 70, the large diameter coil 84 with low spring rigidity deforms first. Then the actuator 70 pivots due to the torque of the main coil part 81 with small diameter, therefore, the colliding force of the paper is reduced and the damage to the paper is reduced.

FIGS. 7A and 7B are illustration diagrams illustrating the operations of the paper detection mechanism and illustrating the pivoting of the lever 71 caused by the paper S. In FIG. 7A, if the paper S is guided by the guide plates 51 and 52, conveyed by the rollers 431 and 432, and then contacted with the lever 71, the lever 71 pivots. The colliding force when the paper collides with the lever 71 is strong, which leads to a problem that thin paper or soft paper may be damaged and the front end thereof may be bent. However, as the large diameter coil 84 with low spring rigidity deforms first when the paper collides with the lever 71, the colliding force can be reduced.

As shown in FIG. 7B, the lever 71 pivots due to the torque of the main coil part 81 of the torsion coil spring 80 as the paper S is conveyed. When the lever 71 pivots, as the colliding force of the paper S is dispersed into the force (Fx) in an X direction and the force (Fy) in a Y direction, the damage to the paper is reduced.

Figure 8A:
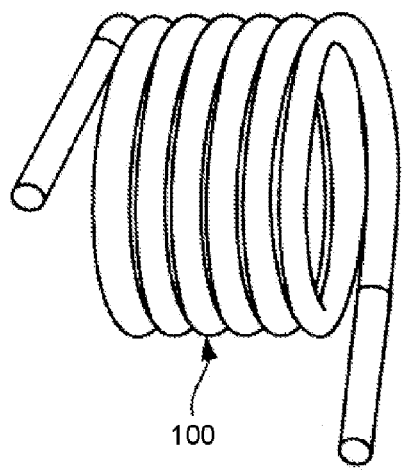
FIG. 8A is a perspective view illustrating a general torsion coil spring.
Figure 8B:
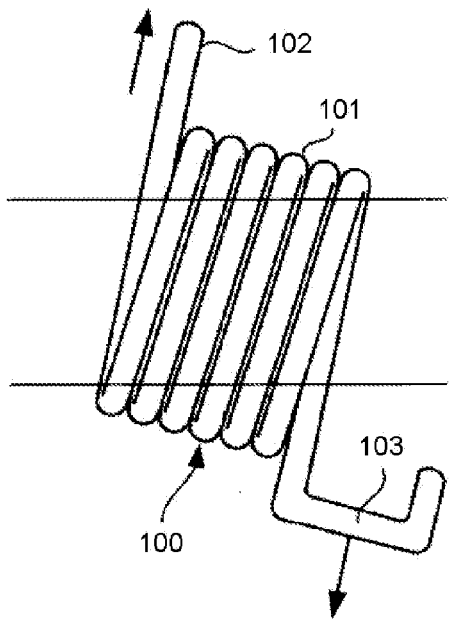
FIG. 8B is a front view illustrating one example in which the general torsion coil spring is used in the paper detection mechanism.

FIG. 8A is a perspective view illustrating a general torsion coil spring 100, and FIG. 8B is a front view of the general torsion coil spring 100 used in the paper detection mechanism. The torsion coil spring 100 shown in FIG. 8B includes a main coil part 101, an arm 102 arranged at one end of the main coil part 101 and an L-shaped arm 103 arranged at the other end.

Figure 9:
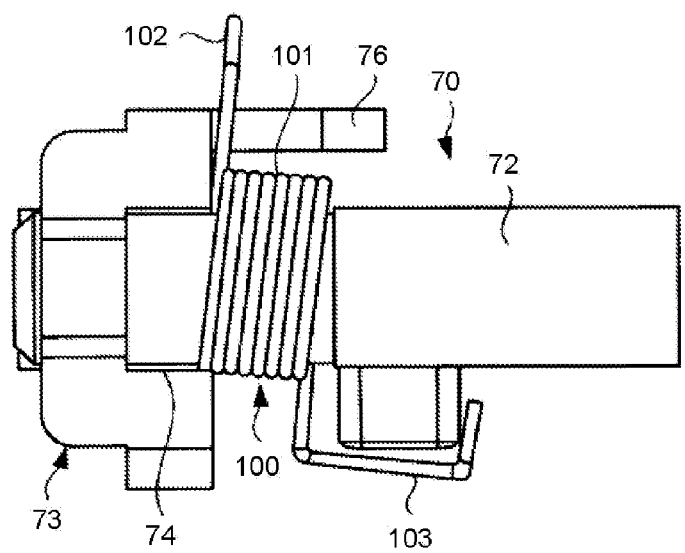
FIG. 9 is a front view illustrating the constitution of a bearing part of the paper detection mechanism in which the torsion coil spring shown in FIG. 8B is used.

FIG. 9 is a front view illustrating the paper detection mechanism which uses the torsion coil spring 100 shown in FIG. 8B. When the arms 102 and 103 are repulsed, the torsion coil spring 100 shown in FIG. 8B slants due to the structure characteristic. In a case where the torsion coil spring 100 is used in the paper detection mechanism, if the torsion coil spring 100 slants, as shown in FIG. 9, the main coil part 101 enters the supporting section 74 of the bearing 73, which may lead to a poor movement of the actuator 70.

Especially when the bearing 73 is made of resin, and the cylindrical part 75 is formed by combining two semicircles (refer to FIG. 4), the coil part of the torsion coil spring 100 is easily stuck by the surface of the supporting section 74, which leads to a high possibility of causing operation failure.

On the other hand, in a case of using the torsion coil spring 80 according to the embodiment in the paper detection mechanism, with the large diameter coil 84, the torsion coil spring 80 can be prevented from slanting on the rotation shaft 72 and the posture thereof can be corrected. Further, as shown in FIG. 5, the coil part can be prevented from entering the bearing 73.

A Second Embodiment

FIG. 10A and FIG. 10B are perspective views illustrating the torsion coil spring 80 according to the second embodiment. In the torsion coil spring 80 shown in FIG. 4, only one turn of coil connected with the first arm 82 is made into the large diameter coil 84, however, in FIG. 10A, the main coil part 81 is formed into a tapered shape in which the diameter of the coil 84 at the side of the first arm 82 is made the largest and the coil diameter gradually decreases towards the second arm 83.

FIG. 10B is an example in which only one turn of coil in the main coil part 81 is made into a large diameter coil 85. In order to prevent the coil part from entering the bearing 73, the coil at the side of the first arm 82 is made the large diameter coil; however, the present invention is not limited to this, any turn of coil in the main coil part 81 may be made into the large diameter coil to prevent the coil part from entering the bearing 73. Similarly, in the torsion coil spring 80 shown in FIG. 10B, the large diameter coil 85 with low spring rigidity deforms first when the paper S is conveyed and contacted with the lever 71, thus, the colliding force can be reduced.

FIG. 11 is a perspective view illustrating a case in which the torsion coil spring 80 shown in FIG. 10A is used in the paper detection mechanism. As shown in FIG. 11, the posture of the torsion coil spring 80 can be corrected with the large diameter coil 84, and the coil part can be prevented from entering the bearing 73. The large diameter coil 84 with low spring rigidity deforms first when the paper S is conveyed and contacted with the lever 71, thus, the colliding force can be reduced.

In addition, no specific limitation is given to the number of turns of the large diameter coil 84 or 85, and it may be one turn, two turns, three turns or more, as long as the number is smaller than the number of turns of the main coil part 81.

Figure 12:
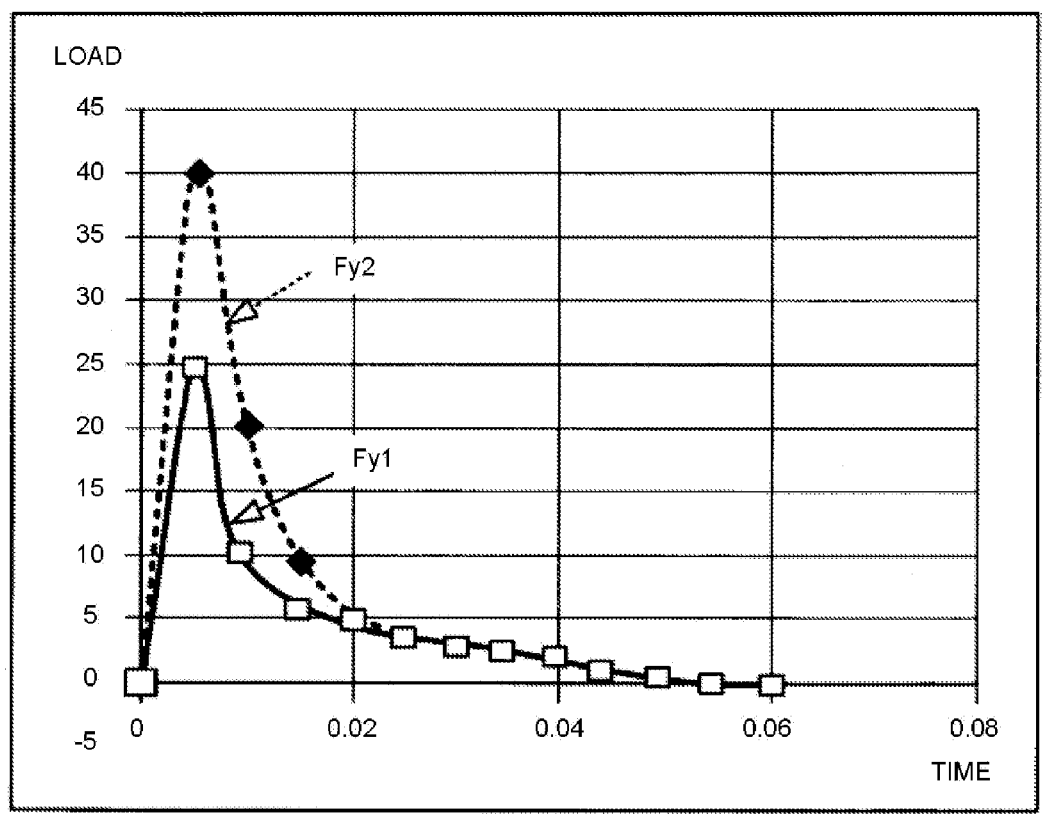
FIG. 12 is a graph illustrating the load characteristic when the paper is conveyed and collides with a lever.

FIG. 12 is a graph illustrating the load characteristic when the paper S is conveyed and collides with the lever 71. The ordinate of FIG. 12 represents the load and the abscissa represents time (sec.). The characteristic Fy1 shown by solid line in FIG. 12 represents the colliding force applied to the paper when the torsion coil spring 80 according to the embodiment is used, and the characteristic Fy2 shown by dotted line represents the colliding force applied to the paper when the general torsion coil spring 100 is used.

As described in FIG. 7B, when the lever 71 pivots, the colliding force of the paper S is dispersed into the force (Fx) in the X direction and the force (Fy) in the Y direction. When the torsion coil spring 80 is used, the large diameter coil 84 with low spring rigidity deforms first when the paper S collides with the lever 71, thus, the force (Fy1) in the Y direction applied to the paper S is reduced, and the load can be reduced. When the general torsion coil spring 100 is used, the force (Fy2) applied in the Y direction increases, and the load applied to the paper S is increased.

Thus, in accordance with the image forming apparatus according to the embodiment described above, even in a case where thin paper or soft paper is conveyed, it can reduce the possibility that the front end of the paper deforms when colliding with the lever 71 and paper jam occurs. Further, as part of the spring can be prevented from entering the bearing 73 with the large diameter coil 84 of the torsion coil spring 80, the actuator 70 can operate normally, and the conveyance of paper can be detected correctly.

Moreover, the application of the present invention is not limited to the embodiment descried above. For example, the torsion coil spring 80 is not limited to be used in an image forming apparatus like the MFP; it may be used in a printer, a copier and the like. Further, the torsion coil spring 80 may also be used in various electric appliances or mechanical products.

While certain embodiments have been described, these embodiments have been presented by way of example only, and are not intended to limit the scope of the invention. Indeed, the novel embodiments described herein may be embodied in a variety of other forms; furthermore, various omissions, substitutions and changes in the form of the embodiments described herein may be made without departing from the spirit of the invention. The accompanying claims and their equivalents are intended to cover such forms or modifications as would fall within the scope and spirit of the invention.

What is claimed is:

1. An image forming apparatus, comprising:
    a paper conveyance section configured to guide paper along a conveyance path and a paper detection mechanism configured to detect the paper passing through the conveyance path; wherein
    the paper detection mechanism comprises:
        a rotation shaft configured to extend in a direction orthogonal to a conveyance direction of the paper passing through the conveyance path;
        a lever integrally configured on the rotation shaft;
        a bearing configured to support the rotation shaft;
        a torsion coil spring, which is arranged around the outer periphery of the rotation shaft to energize the front end of the lever so that the lever protrudes to the conveyance path, configured to integrally include a main coil part which is composed of a plurality of turns of coil and has a preset diameter, and a large diameter coil part which is larger in diameter than the main coil part and less in the number of turns than the main body coil part; and
        a sensor configured to detect the conveyance of paper when the lever pressed by the paper passing through the conveyance path pivots.

2. The apparatus of claim 1, wherein
    the torsion coil spring is provided with at least one turn of the large diameter coil part.

3. The apparatus of claim 1, wherein
    the torsion coil spring is formed in such a manner that the large diameter coil part with weak spring force deforms first when the paper is conveyed and collides with the lever.

4. The apparatus of claim 1, wherein
the torsion coil spring arranges the large diameter coil part at the end part of the main coil part, and the torsion coil spring is arranged around the outer periphery of the rotation shaft in such a manner that the large diameter coil part is contacted with the bearing.

5. The apparatus of claim 4, wherein
the torsion coil spring includes a first arm which extends from the large diameter coil part and is hooked by the bearing and a second arm which extends from the other end of the main coil part and supports the lever.

6. The apparatus of claim 1, wherein
the torsion coil spring provided with the large diameter coil part at one end of the main coil part is formed in such a manner that the diameter of the main coil part gradually decreases towards the other end, and the torsion coil spring is arranged around the outer periphery of the rotation shaft in such a manner that the large diameter coil part is contacted with the bearing.

7. The apparatus of claim 1, wherein
the bearing includes a supporting section for supporting one end of the rotation shaft and a cylindrical part which is formed and concatenated with the supporting section and into which the front end of the rotation shaft is inserted, and
the torsion coil spring arranges the large diameter coil part at the end part of the main coil part and contacts the large diameter coil part with the end surface of the supporting section to prevent itself from slanting on the rotation shaft through the large diameter coil part.

8. The apparatus of claim 1, wherein
the conveyance path includes a pair of opposed guide plates on which windows are formed respectively, and guides the paper between the pair of opposed guide plates,
the rotation shaft is arranged on either of the pair of guide plates in such a manner that the lever protrudes from the window,
the torsion coil spring energizes the front end of the lever in a direction opposite to the paper conveyance direction, and
the lever pivots against the spring force of the torsion coil spring when the paper is conveyed.

9. The apparatus of claim 1, wherein
the rotation shaft includes an interrupter which rotates as the lever pivots, and the sensor includes a light projection section and a light receiving section, wherein
the light from the light projection section to the light receiving section is shielded through the rotation of the interrupter, and thereby the conveyance of paper is detected.

10. The apparatus of claim 1, further comprising:
an image forming section configured to form an image on the paper, wherein
the conveyance path includes a first conveyance path which guides the paper from a cassette for storing the paper to the image forming section, and a second conveyance path which guides the paper from the image forming section to the paper discharge section, and
the paper detection mechanism is arranged on the first or the second conveyance path.

11. The apparatus of claim 1, further comprising:
an image forming section configured to form an image on the paper, wherein
the conveyance path further includes a third conveyance path which reverses the paper on which an image is formed by the image forming section and guides the paper to the image forming section, and
the paper detection mechanism is arranged on the third conveyance path.

12. The apparatus of claim 1, wherein
the paper detection mechanism is arranged in such a manner that the lever is located at the approximate center portion of the paper conveyance path.

13. The apparatus of claim 1, wherein
the paper conveyance section conveys the paper in sequence if the sensor detects that the paper is normally conveyed.

14. The apparatus of claim 1, wherein
the paper conveyance section stops the conveyance of paper if the sensor detects that the paper is not conveyed normally.

* * * * *